United States Patent

[11] 3,573,810

[72] Inventors Lorenz Hanewinkel;
Winfried Schneider, Paderborn, Germany
[21] Appl. No. 775,059
[22] Filed Nov. 12, 1968
[45] Patented Apr. 6, 1971
[73] Assignee Nixdorf Computer Aktiengesellschaft
[32] Priority Nov. 10, 1967
[33] Germany
[31] P 15 37 278.8

[54] MECHANICALLY ACTUATED MAGNETIC SWITCH ARRANGEMENT
7 Claims, 6 Drawing Figs.

[52] U.S. Cl. .......... 340/365, 340/347DD, 178/17C
[51] Int. Cl. .......... G08c 9/00
[50] Field of Search .......... 340/365

[56] References Cited

UNITED STATES PATENTS 3,439,117 4/1969 Mathamel .......... 340/365
3,457,368 7/1969 Houcke .......... 340/365
3,495,236 2/1970 Mathamel .......... 340/365

*Primary Examiner*—Thomas B. Habecker
*Attorney*—Breitenfeld & Levine

ABSTRACT: A mechanically actuated magnetic switch arrangement includes a plurality of closed magnetic cores and a plurality of windings on each core. A magnetic saturation element is near each core, and means respond to actuation of a switch lever associated with each core for permitting or preventing saturation of that core. A rest-position loop is connected to one winding on each core and delivers an input signal to an amplifier. The output of the amplifier is connected to an electronic lock for preventing more than one signal at a time from emanating from the switch arrangement.

INVENTORS:
LORENZ HANEWINKEL
WINFRIED SCHNEIDER
BY
Breitenfeld & Levine
ATTORNEYS INVENTORS:
LORENZ HANEWINKEL
WINFRIED SCHNEIDER
BY Breitenfeld & Levine
ATTORNEYS

MECHANICALLY ACTUATED MAGNETIC SWITCH ARRANGEMENT

The present invention relates to a mechanically actuated magnetic switch element consisting of a closed magnetic core having a plurality of coils as well as a magnetic saturation element for the magnetic core, whereby it is brought into a saturated condition and a nonsaturated condition.

The magnetic switch element of the invention is intended for use as converter for the supplying of electric pulses, as a function of key operation. A preferred filed of use of the invention is the production of electronic keyboard pulses for a mechanically actuated keyboard.

There are already known switch elements of the said type in which the magnetic core has an air gap. By changing the coupling of the air gap, in particular by displacement of an armature part, this switch element can be mechanically controlled. In this case, the presence of an air gap is disadvantageous.

It is also known in the case of magnetic set-value memories with toroidal cores to provide saturable magnetic cores whereby the condition of saturation of each toroidal core and thus the coefficient of coupling itself can be adjusted. By displacing these saturatable magnets, a change in the storage content of the set-value memory is made possible.

The object of the present invention is to provide such a development of a switch element of the aforementioned type that the switching condition thereof can be easily changed when desired.

This result is obtained in accordance with the invention by the fact that the saturation element or a screening element for the saturation element is seated directly on a switch lever and is displaceable with the latter to switch the magnetic core between the saturated condition and the unsaturated condition.

As a further development of the invention, it is contemplated that the switch lever be connected with a key lever of a keyboard.

In accordance with the present invention, only the condition of saturation of the magnetic cores is affected so that no additional leakage filed can occur. The switch lever for the switch element can be included without difficulty in a keyboard arrangement.

The output signals of the switch element can be supplied in code form. The switch elements of the keyboard can be interrogated in various manners. Individual interrogation can be provided; differently, within a matrix like arrangement interrogation by the current coincidence method can also be contemplated. The switch element of the invention furthermore makes it possible to establish an electronic lock for the keyboard so that the mechanical locking devices can be simplified or be entirely eliminated.

The invention will now be explained on basis of preferred embodiments with reference to the accompanying drawings in which.

Figures 1, 2:
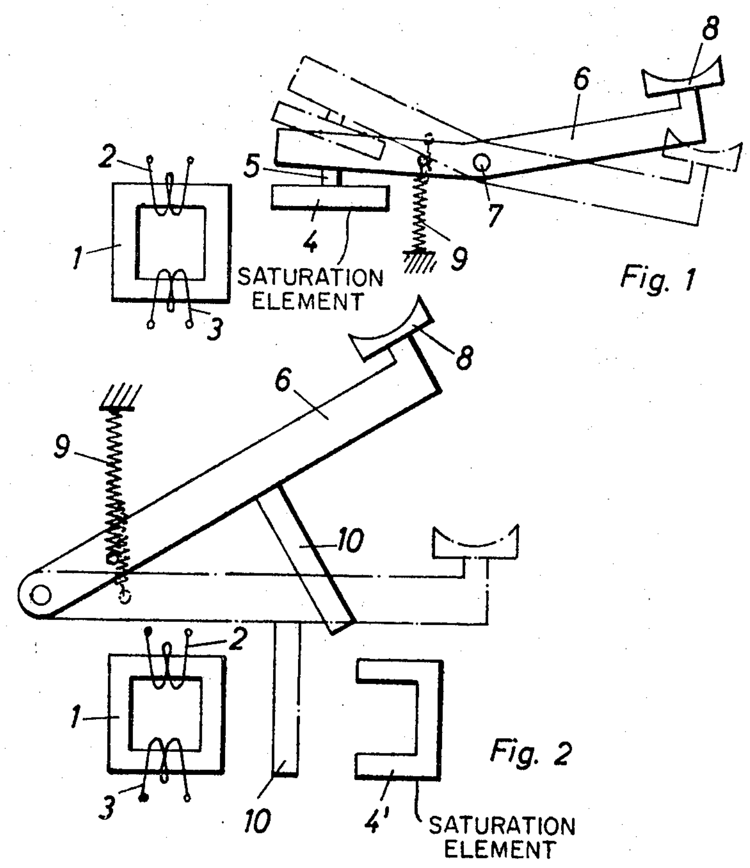
FIG. 1 shows a first embodiment of a switch element of the invention combined with a key lever.
FIG. 2 shows a modified embodiment of the invention.

FIG. 1 shows a toroidal core 1 having a primary winding 2 and a secondary winding 3. A plurality of primary and/or secondary windings could also be present. Opposite the magnetic core 1 is a magnetic saturation element 4 which is seated via a shift lever 5 on a key lever 6. The key lever 6 is seated on a pivot pin 7 and bears a key 8. Furthermore, a return spring 9 is provided. The key arrangement is merely shown schematically. The saturation element 4 can be pivoted to any customary key lever arrangement.

The position of rest of the key lever 6 and of the saturation element 4 are shown in solid lines. In this case the saturation element 4 is so close to the toroidal core 1 that the latter is brought into its saturation condition. As a result, the coupling between the primary winding 2 and the secondary winding 3 disappears practically completely. Upon depression of the key 8 (shown in dashed line) the saturation element 4 is moved away from the toroidal core 1 so that the toroidal core 1 now acts as coupling element between the primary winding 2, and the secondary winding 3. Upon excitation of the primary winding 2, a voltage will accordingly be induced in the secondary winding 3. The toroidal core 1 can consist of a material of square-wave magnetization curve or other magnetization curve. It is merely important that the material of the magnet have a pronounced saturation behavior.

A modified embodiment of a switch element, shown in FIG. 2, has a saturation element 4′ which is arranged in fixed position opposite the toroidal core 1. A magnetic screening element 10 is seated on a key lever 6.

In the position of rest of the key lever 6, the screening element 10 takes up the magnetic flux of the saturation element 4′; in the position of rest of the key lever 6 shown in solid line, the flux of the saturation element 4′ results in a saturation of the toroidal core 1 so that there is no coupling present between the primary and secondary windings. Upon depression of the key lever 6 into the position shown in dot-dash line, the flux of the saturation element 4′ is taken up by the screening element 10 so that the toroidal core 1 now operates as a transformer and produces a coupling between the primary and secondary windings.

It should again be expressly pointed out that the showings of FIGS. 1 and 2 are merely schematic.

The primary winding can be effected in pulselike fashion by means of symmetric or asymmetric pulses which are produced by a known pulse generator. Output voltages will or will not be induced in the secondary winding depending on the position of switching at the time of the switching element of the invention.

Figure 3:
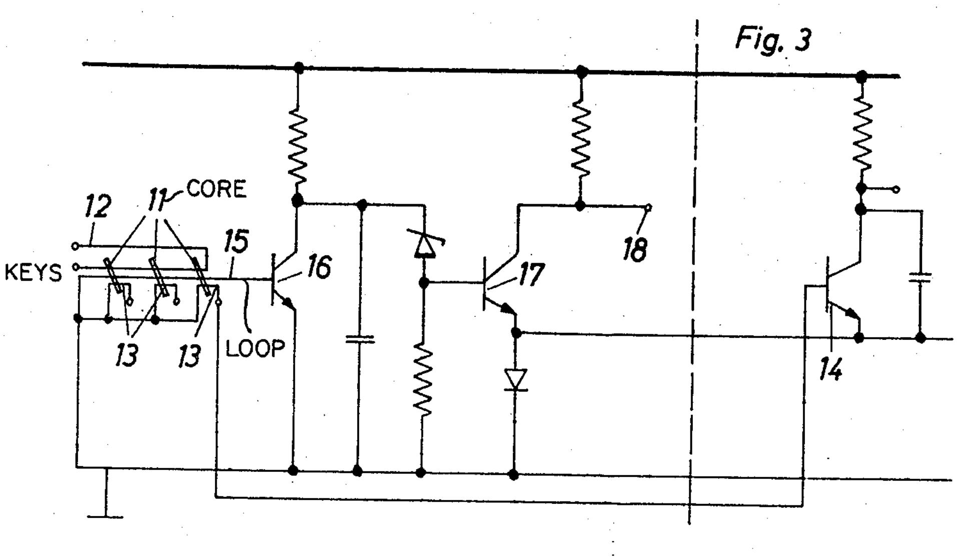
FIG. 3 is a further development of the switch element of the invention for producing an electronic lock.

As shown in FIG. 3, all primary windings of the switch elements 11 of a keyboard can be connected in series with a primary loop 12. The secondary windings 13 are in each case connected individually to a separate amplifier transistor 14, this circuit being also shown schematically in FIG. 3.

Figures 4, 5:
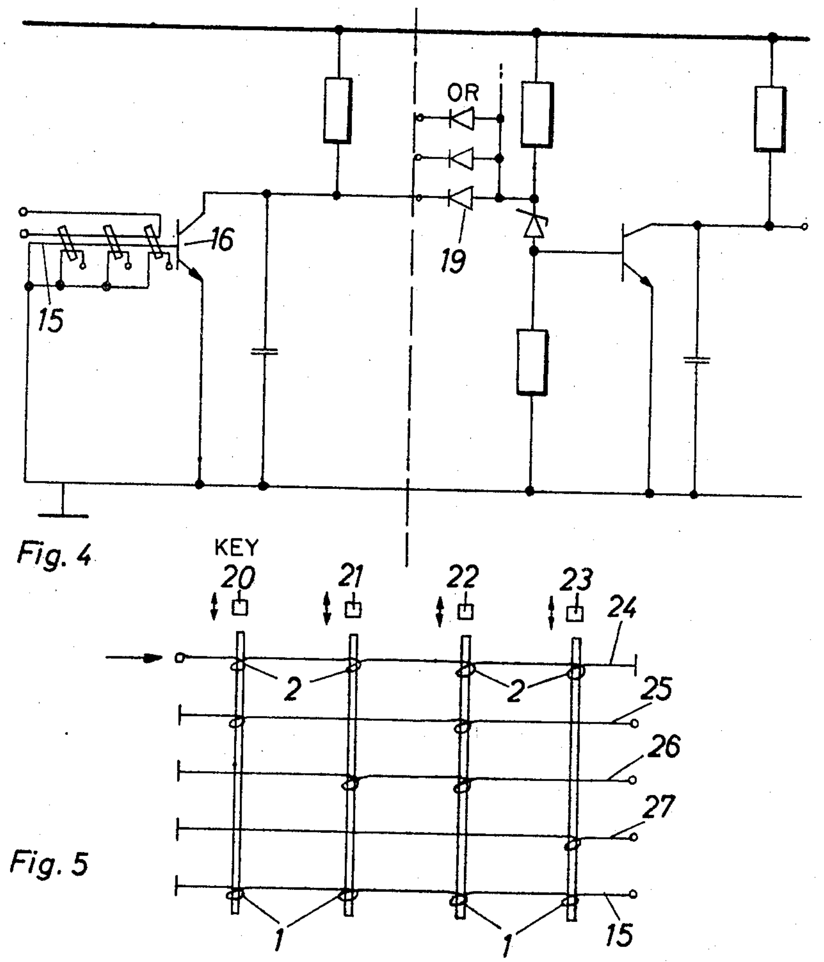
FIG. 4 is a modified development of the electronic lock.
FIG. 5 shows the application of a switch element in accordance with the invention for the production of code output signals.

In order to indicate the position of rest of the keyboard, there can be conducted through all the toroidal cores a rest-position loop 15 which in each case connects secondary rest-position windings of the toroidal cores in series. The rest-position loop 15 is connected to an amplifier transistor 16 of comparatively low threshold of response. Behind the amplifier transistor 16, there is connected a second amplifier stage 17. A pulse can be taken from the output 18 of the latter whenever, due to the actuation of any key, a switch element of the keyboard is brought into its nonsaturation condition. This switch pulse can be used to actuate an electronic lock. One can thus in particular suppress multiple response of the amplifier stage 14 during the time of the striking of a key. In accordance with FIG. 4, for reasons of intensity, a rest-position loop 15 may in each case extend only through a small number of toroidal cores and the outputs of several amplifier stages 16 be combined in an OR circuit 19.

Instead of individual outputs of secondary circuits a code output can be provided. For this purpose, each toroidal core bears several secondary windings, the secondary windings for the same code elements being connected in series with each other within the entire keyboard. In the case of such a series connection, it is advisable in each case to wind half of the windings of a code loop in a different direction with respect to the primary flow so that disturbances will be substantially suppressed. Such a construction of a keyboard is shown schematically in FIG. 5. A total of four keys, 20, 21, 22, and 23 are shown. The toroidal cores are shown in this diagram as bar-shaped elements 1. Each toroidal core 1 bears a primary winding 2, all the primary windings being combined to form a primary loop 24. Three code loops 25, 26 and 27 are present, connecting in each case corresponding code windings in series with each other. A rest-position loop 15 is also shown. With such a code arrangement, an electronic lock in the manner described above is also possible.

Figure 6:
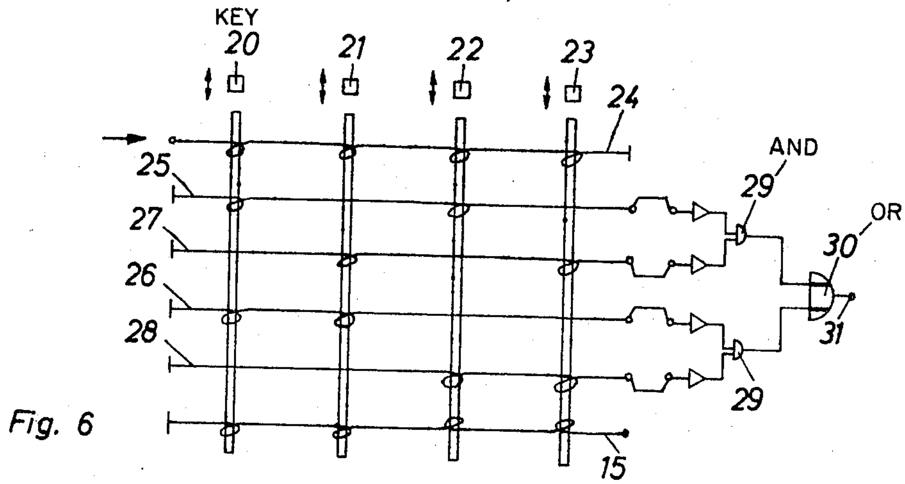
FIG. 6 shows a switching arrangement for recognition of multiplex operation.

If the keyboard has a comparatively simple mechanical lock in connection with which in each case another key can already be actuated before the key which has been previously actuated has reached its rest position, then when using a switch element in accordance with the invention, one can assure the proper and in each case unique processing of a symbol which is truck in the manner that in addition to the rest-position loop, the complements of the code symbols are furthermore shown. Such an arrangement is shown schematically in FIG. 6. In accordance with it, there are provided in each case for the code loops 25 and 26 complementary loops 27 and 28. If two keys 20 and 21 are struck simultaneously, both complementary lines 25 and 27 are excited at least for one code symbol so that an AND circuit 29 connected to said complementary lines gives off an output signal. The AND circuits 29 of all code lines are combined in an OR circuit 30 at whose output 31 a signal appears when both complementary values for a code symbol are present, i.e., if at least two keys are struck simultaneously. Dependable character recognition is possible with this arrangement. In such case, evaluation of a code symbol can take place when the condition of rest is reported by the rest-position loop between the striking two keys or when another code symbol is clearly picked up which is made possible by means of the logical circuit of FIG. 6.

Within the scope of the invention, the toroidal cores can be made of a substance having a square-wave characteristic whereby coincidence interrogation of the matrix is made possible. One can also interchange the functions of the primary and secondary windings. The code windings then serve as primary windings which must be interrogated one after the other. As secondary winding, there is provided in this case a reading winding, all reading windings of the keyboard being connected in series.

We claim:

1. A mechanically actuated magnetic switch arrangement, comprising a plurality of closed magnetic cores, a plurality of windings on each core, each core being able to transmit a signal from one of its windings to another only when it is unsaturated, a magnetic saturation element near each of said cores, a switch lever associated with each core, means responsive to actuation of each switch lever for alternatively permitting or preventing saturation of its respective core by the magnetic saturation element near that core, a rest-position loop connected to one of said windings on each of said cores, and an amplifier connected to said rest-position loop so as to receive an input signal from the latter, the output of said amplifier being connected to an electronic lock for preventing more than one signal at a time from emanating from said switch arrangement.

2. A mechanically actuated magnetic switch arrangement as defined in claim 1 including a plurality of said rest-position loops, the windings connected to each loop being on cores different from the cores of windings connected to the other loop or loops, a separate amplifier connected to each of said loops, the outputs of all said amplifiers being connected to an OR circuit.

3. A mechanically actuated magnetic switch arrangement as defined in claim 1 wherein each of said cores carries a primary winding and at least some of said cores carry a plurality of secondary windings, the secondary windings of different cores being connected together in series to define predetermined coded loops, each of said coded loops having a complementary loop, each of said coded loops and its complementary loop being connected to a separate AND circuit, and all said AND circuits being connected to an OR circuit.

4. A mechanically actuated magnetic switch arrangement as defined in claim 1 wherein each of said cores carries a primary winding and at least some of said cores carry a plurality of secondary windings, the secondary windings of different cores being connected together in series to define predetermined coded loops, half the windings of each coded loop being wound in a direction with respect to the primary flow different from the direction in which the other half of said loop windings are wound.

5. A mechanically actuated magnetic switch arrangement as defined in claim 1 wherein the material from which said cores are made has a square-wave characteristic.

6. A mechanically actuated magnetic switch arrangement as defined in claim 1 wherein each of said magnetic saturation elements is carried by and movable with its respective switch lever, said lever being normally positioned to locate said saturation element close enough to its respective core to saturate the latter, movement of said lever causing movement of said saturation element away from said core to unsaturate the latter.

7. A mechanically actuated magnetic switch arrangement as defined in claim 1 wherein each of said cores and its respective magnetic saturation element is separated by a space, and including a screening element carried by said switch lever and movable upon actuation of the latter into or out of said space.